United States Patent Office 3,476,649
Patented Nov. 4, 1969

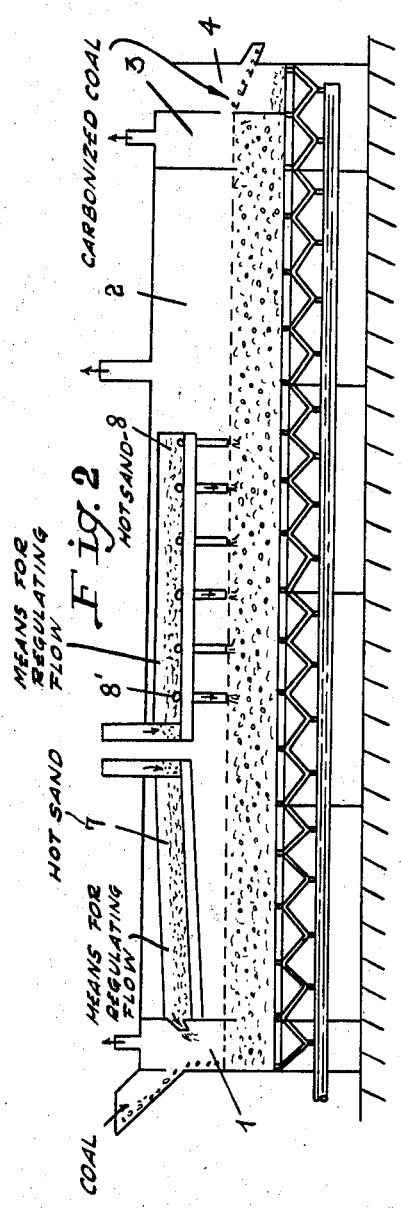
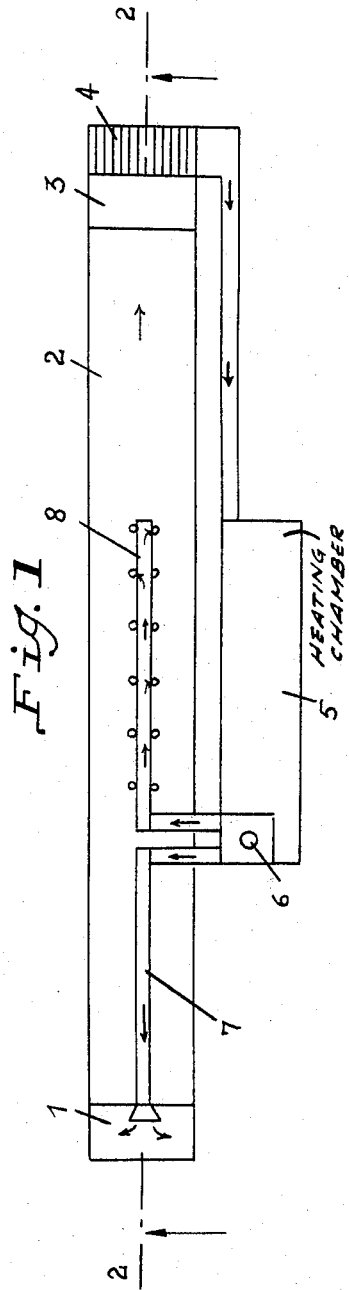

3,476,649
CARBONISATION OF SOLID FUELS
Pierre Leon Victor Ledent, Tilff, Belgium, assignor to Institut National de L'Industrie Charbonniere, Liege, Belgium
Filed Apr. 9, 1965, Ser. No. 446,879
Claims priority, application Belgium, Apr. 17, 1964, 40,126, Patent 646,741
Int. Cl. C10b 57/12, 53/08, 49/16
U.S. Cl. 201—12         2 Claims

ABSTRACT OF THE DISCLOSURE

A method and device for the carbonisation of briquettes or pieces of solid fuel by treatment in a bed of granulated material used as thermofor, fluidised intermittently and which flows by gravity in a fluidised channel that is at a slight slope, comprising distributing the material used as thermofor in two fractions, one of which is introduced as the entry of the treatment channel simultaneously with the products to be treated, the other being added progressively at a plurality of stations into the mid-part of the treatment channel so as to reheat the mixture.

---

The invention has for its object improvements in methods and apparatus for the carbonisation of solid fuels in the form of briquettes, or pieces.

It is known that briquettes or pieces of coal or other solid fuels can be treated in a bed of sand or other granulated material used as thermofor, fluidised continuously or intermittently and which flows by gravity from one end to the other of a horizontal treatment channel or one that is inclined at a slight slope, wherein the speed of fluidisation, the granulometry and the specific weight of the thermofor are regulated in such a way that the apparent density of the fluidised bed is a little greater than the density of the products to be treated.

It is also known that the fluidisation of the treatment channel, can be carried out intermittently, by alternating very short periods of fluidisation with relatively long periods of stationary bed.

In the said methods all the hot sand used as thermofor is introduced at the entry to the treatment channel, simultaneously with the products to be treated.

Experiments have been carried out and have shown that to avoid a too abrupt thermal shock which might damage the products to be treated, it was advantageous to fractionate the introduction of the thermofor.

In the process in accordance with the invention the rate of flow of hot sand or other material used as thermofor is distributed in two fractions; the first fraction is introduced at the entry of the treatment channel simultaneously with the products to be treated; the temperature and the rate of flow of the said first fraction are regulated in such a way that after 15 to 20 minutes of mixing, the temperature of the mixture thermofor+products is between 440° C. and 480° C. The second fraction is added progressively in the mid-part of the treatment channel, so as to reheat the mixture, the temperature and the rate of flow of the said second fraction being regulated in such a way that at the outlet of the treatment channel, the temperature of the mixture thermofor+products is between 500° C. and 600° C.

When the said method is used for the treatment of briquettes of 20 grams, the total carbonisation time is between 50 and 75 minutes.

By way of example there are given below the results obtained by the progressive carbonisation of a type of briquette of approximately 20 grams:

| Composition: | Percent |
|---|---|
| Coking coal (at 25% VM) | 94 |
| Lignosulphite in powder form | 1 |
| Sulphur | 1 |

| Conditions of treatment: | |
|---|---|
| Total duration _____minutes__ | 60 |
| Initial temperature of the sand _____° C__ | ±650 |
| Temperature after mixture of the first fraction _____° C__ | 470 |
| Final temperature of the mixture sand+briquettes _____° C__ | 530 |

| Characteristics of the briquettes: | |
|---|---|
| Specific weight _____g./cm.$^3$__ | 0.88 |
| Resistance to compression _____kilos__ | 117 |
| Volatile matter (dry basis) ____percent__ | 10.1 |

The present invention also concerns apparatus adapted to carry out the said method of carbonisation and, for carbonisation by treatment in a bed of sand or other material used as thermofor, fluidised intermittently and flowing by gravity in a horizontal channel, or one that is inclined at a slight slope, said apparatus has the feature that the heating chamber of the thermofor is connected to the treatment channel by two channels distributing the thermofor, provided with means for regulating the flow, one of which at the entry of the treatment channel and the other feeds a elevated distribution channel carried out in the form of an air slide and having a series of flow orifices which make it possible to distribute the thermofor in the mid-part of the treatment channel.

The invention will now be described solely by way of example and in no restrictive sense, by means of the attached drawings, which shown an apparatus or furnace for carrying out the method of carbonisation of the invention.

FIGURE 1 shows a plane view in diagrammatic form of the treatment furnace.

FIGURE 2 shows a diagrammatic section along the line 2—2 of FIGURE 1.

Referring to the drawing, the main members of the furnace are as follows: entry sluice 1, treatment channel 2, outlet sluice 3, sieve 4, heating chamber for the sand used as thermofor 5, lifting device i.e. air lift for the sand 6, distribution for the first fraction of hot sand 7, distribution channel for the second fraction of hot sand 8.

A furnace of this type, in which the entry and outlet sluices 1 and 3 respectively are separated from the treatment channel 2 by partitions dipping down under the level of the sand in such a way as to form a trap, has the feature that there are two distribution channels for the hot sand or other thermofor, provided with means for regulating the rate of flow, i.e. the channels 7 and 8 respectively, the channel 7 connecting the heating chamber of the sand 5 to the entry of the treatment channel 2, and the channel 8 in connection with the said heating chamber and forming the elevated distribution channel, carried out in the form of an air slide and having a series of orifices 8', which make it possible to distribute the second fraction of the flow of sand into the mid-part of the treatment channel 2, as can be seen in the drawing.

What I claim is:
1. A method for the carbonization of briquettes or pieces of solid fuel by treatment in a bed of granulated material used as thermofor, fluidized intermittently and which flows by gravity in a fluidized channel that is at a slight slope, comprising directing the material used as thermofor in two parallel paths, one of the paths introduced at the entry of the treatment channel simul- taneously with the products to be treated, the other path being added progressively at a plurality of stations into the mid-part of the treatment channel so as to reheat the mixture, the plurality of stations extending longitudinally of the fluidized channel.

2. The method of claim 4, further comprising regulating the temperature of the thermofor and the rate of flow in each of the two parallel paths in such a way that the temperature of the mixture products to be treated+first path is between 440° C. and 480° C. and the final temperature of the products to be treated+first path+second path is between 500° C. and 600° C.

References Cited

UNITED STATES PATENTS

| | | | |
|---|---|---|---|
| 2,638,219 | 1/1951 | Welty | 201—31 XR |
| 2,776,935 | 1/1957 | Jahnig et al. | 201—31 XR |
| 2,064,715 | 12/1936 | Atwell | 201—12 XR |
| 2,835,554 | 5/1958 | Pardee | 201—33 XR |
| 3,020,209 | 2/1962 | Culbertson et al. | 201—12 |
| 3,085,947 | 4/1963 | Tufty | 201—20 XR |

FOREIGN PATENTS 503,199   5/1951   Belgium.

NORMAN YUDKOFF, Primary Examiner

D. EDWARDS, Assistant Examiner

U.S. Cl. X.R.

201—20, 31